Patented May 2, 1933

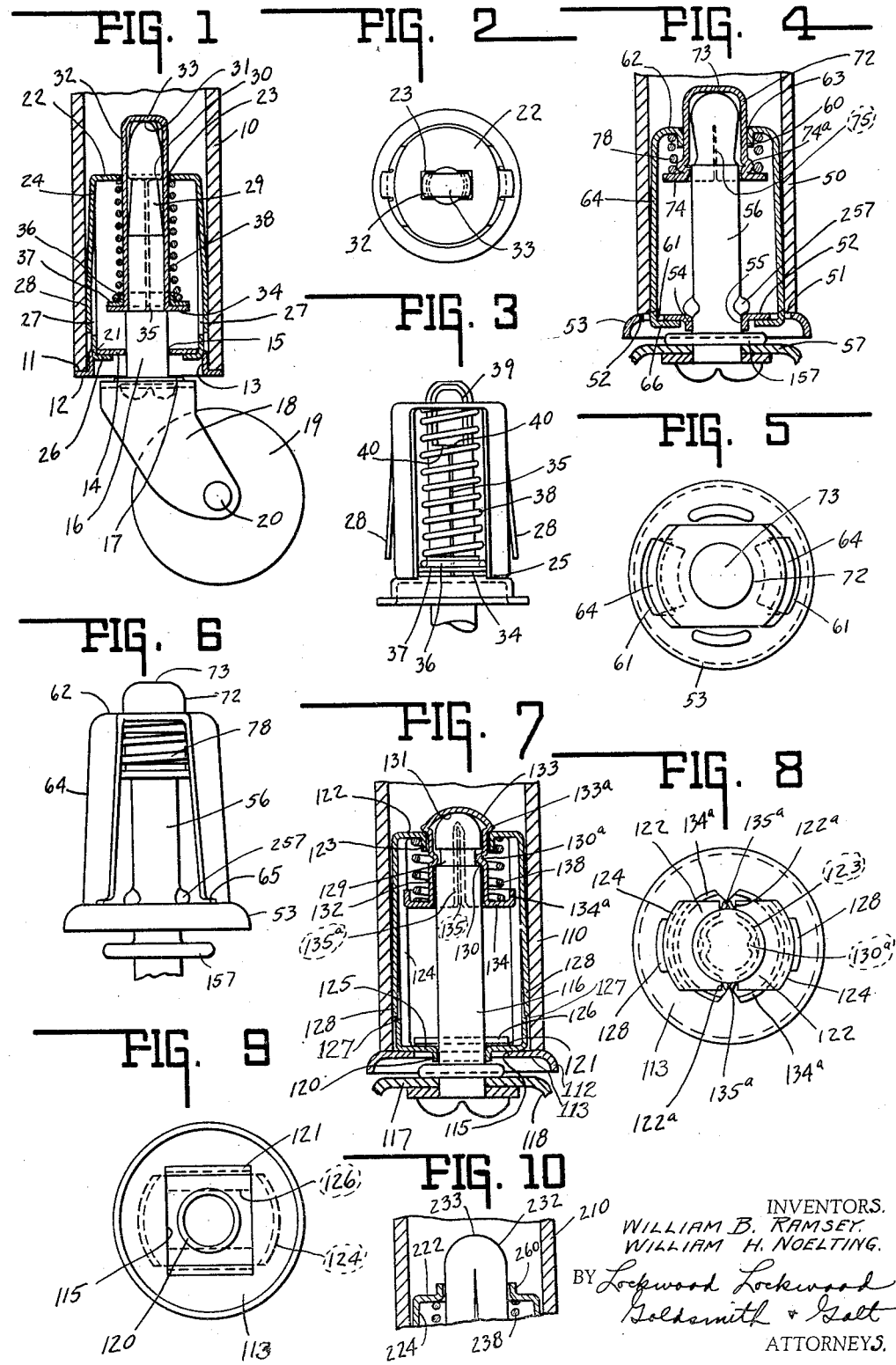

1,906,238

UNITED STATES PATENT OFFICE

WILLIAM B. RAMSEY, OF ATLANTA, GEORGIA, AND WILLIAM H. NOELTING, OF EVANSVILLE, INDIANA, ASSIGNORS TO FAULTLESS CASTER COMPANY, OF EVANSVILLE, INDIANA, A CORPORATION

TOP BEARING ADJUSTABLE AND CUSHION FRAME FOR CASTERS

Application filed June 2, 1932. Serial No. 614,926.

This invention relates to a caster and socket for a tubular leg, said caster having a cushion connection with the socket.

The chief object of this invention is to provide a caster socket for detachable mounting upon tubular legs having variations from a predetermined size of opening and which yieldingly supports a caster structure so that the caster is normally constrained toward supporting surface engagement independent of the variation in the supporting surface or the variation in the length of legs supporting the load so that the caster element will always be maintained in contact with the supporting surface.

The chief feature of the invention consists in the employment of a concentric resilient member or means which is interposed between the stem or pintle and the socket and is partially enclosed thereby and which is adapted to floatingly support the tubular leg and load carried thereby.

Another feature of the invention consists in forming a socket and stem connection such that it may be detached or attached with difficulty or may be permanently secured together.

The full nature of the invention will be understood from the accompanying drawing and the following specifications and claims:—

In the drawing, Fig. 1 is a central sectional view through a load supporting tubular leg, a caster socket, the caster being shown in elevation.

Fig. 2 is a top plan view of a caster socket.

Fig. 3 is a side elevational view of the socket receivable portion of the caster and the socket associated therewith.

Fig. 4 is a central sectional view of a modified form of a socket and caster, the stem thereof being shown in elevation and parts of the caster being omitted.

Fig. 5 is a top plan view of the socket.

Fig. 6 is a side elevation of the socket and caster portions shown in Fig. 4.

Fig. 7 is a view similar to Fig. 1 and of a modified and inverted form of the invention.

Fig. 8 is a top plan view of the socket, the caster being omitted.

Fig. 9 is a bottom plan view of the socket, the caster being omitted.

Fig. 10 is a central sectional view through the top portion of a modified form of the invention.

In Figs. 1 to 3 of the drawing, 10 indicates a tubular leg having a lower edge 11. A plate, having a flange 12 adapted to underlie the edge 11 that engages the same, includes a centrally embossed portion 13 and a central flat portion 14 apertured as at 15 to slidably receive and rotatably support a stem or pintle 16 of a caster that herein is shown as of the wheel type, said stem being carried by the yoke 17 and having the ears 18 which rotatably support therebetween the wheel 19 on the axle 20. A caster slide of the stem type, it will be readily understood, may be substituted for the wheel caster illustrated herein.

The horizontal plate portion 14 is provided with a pair of spaced diametrically positioned apertures 21. An inverted U-shaped strap having the transverse central portion 22 is centrally apertured as at 23 and includes two parallel longitudinal arms 24 that terminate at their lower ends in laterally reduced shoulders 25, the arm being extended to form tongue 26 receivable by the slot 21 until the shoulders 25 engage the plate 14. The tongue portion 26 is turned angularly and herein inwardly and underlies the horizontal plate portion 14.

In this form of the invention, the arms as a whole are connected in relatively rigid connection to the load supporting plate. To provide for frictional engagement between the socket and the tubular leg and to provide for variation from the predetermined size of opening in said leg, each of the arms 24 is slotted as at 27 and there is thereby provided a tongue portion 28 which is normally constrained outwardly. In other words, portions of the arm are constrained toward separated relation.

The stem 16 herein is shown provided with a reduced neck portion 29 and there is formed thereby a shoulder 30. The head 31 of the stem is shown rounded for top bearing contact. A tube 32 has a closed upper end 33 and said tube is relatively elongated and includes an outwardly directed flange 34 at its open end. The tube is shown formed of a strip of sheet metal folded upon itself as is conventional in certain stem caster sockets, the median engagement being indicated at 35 in Fig. 1.

To prevent separation of the open end of the tube into its component parts, a flanged sleeve 36 having a flange 37 is telescopically mounted on the tube and bears against the flange portion 34. Herein the flange 34 and flange 37 are shown of equal diameter. Flange 37 or the operative flange hereinafter more specifically described, may be of the largest diameter and may, if desired, include an upturned peripheral collar, thereby forming an annular groove in radial section.

Engaging the flange 37, or operatively engaging the flange 34, is one end of a coil spring 38, the other end bearing on the underside of the central portion 22 of the inverted U-shaped frame. Spring 38 normally constrains the tube and the stem or pintle downwardly relative to the socket.

In the present form of the invention—see Figs. 2 and 3—the tube instead of being completely closed adjacent its ends, is cut out as at 39, forming shoulder portions 40. These shoulder portions are slightly indented and underlie the shoulder 30 of the caster stem. With this type of connection the tube and the stem may be considered as a unit and in the event the caster wheel or yoke breaks or if a slide or shoe is carried by the stem and the shoe or slide should break, a new caster may be readily substituted by raising the indented portions with a screw driver and then detaching the stem from the tube.

The aperture 23 is an elongated aperture and thus the tube is prevented from independent rotation with respect to the frame, yet the stem may freely swivel in the tube. Lateral play of the entire frame is prevented by the circular embossment 13 on the load supporting plate, this being slightly tapered to accommodate slight variation in the interior diameter of the tubular leg.

The strength of the spring may be such that it is arranged to carry its portion of the load and in that event, the spring will not be fully compressed nor compressed to the extent of where the load sustaining plate engages the top of the horn. In other words, floating support for the tubular leg is thereby provided. The socket by reason of the aforesaid structural arrangement, has limited sliding movement with respect to the tube and the stem.

The modified forms shown in Figs. 4 to 6, inclusive, of the drawing, represent a sturdier or heavier construction. That shown in Figs. 1 to 3, inclusive, is particularly adaptable for dressers, chiffoniers, chifforobes and beds, while that shown in Figs. 4 to 6, inclusive, is particularly adaptable for the washing machine trade and other allied lines.

In Figs. 4, 5 and 6, 50 indicates the tubular leg having the lower edge 51 engageable by the horizontal portion 52 of the load sustaining plate. Herein the load sustaining plate includes a downturned skirt 53 and a collar 54 defining a stem or pintle receiving central aperture 55. The stem 56 supports the yoke 57 and the stem includes the enlargement 157 which is engageable by the end of the collar 54, under certain conditions hereinafter set forth. The stem also includes lateral enlargements 257 which lie above the plate 52 and thus the plate has limited sliding movement with respect to the pintle and rotatably supports said pintle. The U-shaped frame is herein shown of inverted character and includes the central transverse portion 62 centrally apertured at 63 and defined by a depending collar 60.

Depending from the transverse portion 62 are the longitudinally directed arms 64 which are shouldered as at 65 at their lower ends and each tongue extension 66 thereof extends through the opening 61 in the plate and said end 66 is turned angularly of the arm portion and lies below the plate and herein is directed inwardly. The two slots 61 are diametrically positioned, as shown, and are of considerable width thereby permitting the lower ends of the frame arms to move outwardly or toward separating position, as shown in Fig. 6. Of course, the length of the extension 66 is greater than the radial width of the slot 61 so that the longitudinal separation between the plate and the frame is prevented. This type of structure, therefore, provides a frame socket that frictionally engages the interior of the tubular leg and will accommodate a predetermined size of tubular leg and all normal variations therefrom with equal facility.

Slidably and, if desired rotatably, mounted in the aperture 63 is an elongated tubular member 72 having the closed end 73. This tube at its open and lower end includes an outwardly directed flange 74. This tube is formed from a metal strap and is partially folded and is partially drawn, the line of folding being indicated by the numeral 75.

The tube adjacent the flange 74 and at 74a may be laterally enlarged by being folded, as shown in said figure, and the purpose of this enlargement is to space the lower end of the spring 78 an equidistance from the tube because of the down turned collar 60 carried by the U-shaped frame, spacing the upper end of the spring from said tube.

The strength of the spring, as before mentioned, may be sufficient to floatingly support the load transmitted by the tube 50 so that the collar 60 would not engage the flange 74 or all of the coils of the spring 78 would not be compressed into direct contact, thereby forming a direct connection between transverse portion 62 and the flange 74.

In Figs. 7, 8 and 9 there is illustrated a modified and inverted form of the invention. In this form of the invention the U-shaped frame is of relatively heavy and rigid construction and includes the two longitudinally directed arms 124 which are longitudinally slotted as at 127 forming outwardly directed tongues 128 which provide for and accommodate all variation in tube size so that the socket will engage the interior of the tubular leg 110 of the load having the lower edge 111, the latter bearing on the plate portion 113 provided with a downturned flange or skirt 112. The plate portion 113 is centrally apertured and upwardly extending from said aperture is a pair of spaced tongues 121 which terminate in inwardly directed flanges or ends 126. The U-shaped strap including the longitudinal arms 124 and the central portion 125, is interposed between and anchored to the plate by the portions 121 and 126 and the portion 125 which extends between the plate 113 and the portions 126 includes a downturned collar 120 defining a central aperture that receives the stem 116 of a caster having the yoke 117 and the ears 118.

The stem 116 terminates in a head which is rounded or curved as at 131 for top bearing contact and adjacent the head the stem is reduced as at 129 forming opposed annular shoulders 130.

The upper end of the U-shaped frame includes two inwardly directed arms 122 with downturned extensions 123. The downturned extensions 123 slidably engage an elongated tubular structure 132, terminating in a closed upper end 133 and the mouth of the tube is defined by outwardly directed flanges 134 which are upturned as at 134a to form a partially annular channel to seat one and the lower end of the spring 138, the upper end bearing upon the underside of the portions 122.

The tube is shown indented as at 130a and the same extends into the annular channel 129 formed in the stem and thus frictionally retains the stem or pintle in the tube and connects the same to the caster socket. To retain the tube in the frame when the caster stem is detached therefrom, the tube is suitably formed as at 133a by indenting or flanging the same so that it will not escape from the U-shaped structure and thus is relatively permanently secured thereto and yet such securing arrangement does not prevent axial movement of the tube with reference to the U-shaped frame. To prevent rotational movement of the tube, the median engagement of the strap portions forming the tube may be extended laterally as at 135a and thus ride in the gaps 122a between the two inwardly directed portions 122 of the U-shaped frame. With this type of structure, the indentations 133a will be sufficient if positioned angularly of the outward flanging 135a. If the flange 135a is omitted, then the annular flange formation 133a is provided in place of the indentations 133a but at the same location.

In Fig. 10 is illustrated a modified form of the invention shown either in Figs. 1 or 4, the cap and tube being shown in elevation. In said figure 210 indicates the leg, 224 the arms, 238 the spring, 232 the tube and 233 the top bearing or cap portion.

Herein the collar 260 is shown turned up. This permits the use of a smaller diametered spring and there is no possibility of interference between the collar and the spring.

While the invention has been described in great detail in the foregoing specification, it is to be understood the various modifications thereof will readily suggest themselves to those skilled in the art to which this invention applies, reference being had to the appended claims. It is to be observed that the form of the invention shown in Figs. 7 to 9 inclusive, is not inherently one of the top bearing type, since the load is directly transmitted from the plate 114 to the yoke 117. The preferred forms of the invention, therefore, are those shown in Figs. 1 to 6 inclusive, wherein the load is transmitted to the caster from the leg through the frame and through the top bearing tubular arrangement, said load transmission being of a cushion character, which, as initially stated, constitutes the chief object of this invention.

The invention claimed is:—

1. A shock absorbing caster including in combination a pintle having a top bearing end, an elongated closed end tube bearing thereon and having a lateral flange adjacent the open end, a U-shaped spring frame, a load sustaining plate rotatably and slidably mounted on the pintle, said frame being secured to the plate at one end and slidably supporting said tube at the opposite end, and substantially concentric resilient means interposed between the flange and the last mentioned frame end for the purpose set forth.

2. A shock absorbing caster including in combination a pintle having a top bearing end, an elongated closed end tube bearing thereon and having a lateral flange adjacent the open end, a U-shaped spring frame, a load sustaining plate rotatably and slidably mounted on the pintle, said frame being secured to the plate at one end and slidably supporting said tube at the opposite end, and substantially concentric resilient means interposed between the flange and the last mentioned frame end for the purpose set forth, opposite side portions of the frame being normally constrained outwardly for side wall frictional engagement to retain the frame in a tubular leg.

3. A shock absorbing caster including in combination a pintle having a top bearing end, an elongated closed end tube bearing thereon and having a lateral flange adjacent the open end, a U-shaped spring frame, a load sustaining plate rotatably and slidably mounted on the pintle, said frame being secured to the plate at one end and slidably supporting said tube at the opposite end, and substantially concentric resilient means interposed between the flange and the last mentioned frame end for the purpose set forth, said flange operatively engaging the plate for limiting pintle axial movement in one direction.

4. A shock absorbing caster including in combination a pintle having a top bearing end, an elongated closed end tube bearing thereon and having a lateral flange adjacent the open end, a U-shaped spring frame, a load sustaining plate rotatably and slidably mounted on the pintle, said frame being secured to the plate at one end and slidably supporting said tube at the opposite end, and substantially concentric resilient means interposed between the flange and the last mentioned frame end for the purpose set forth, said tube and frame opposite end having a non-rotative connection.

5. In combination an inverted U-shaped strap having its lower ends turned angularly and oppositely, a load supporting plate apertured to receive the ends, the latter lying beneath the plate, portions of the arms being capable of movement towards and away from each other, the central portion of the strap being apertured, a closed end tubular construction slidably mounted in the aperture and terminating in an outwardly directed flange positioned between the plate and the central portion of the strap, concentric resilient means operatively interposed between the flange and the plate and compressible under load, and a pintle rotatably and slidably supported by the load supporting plate and having its upper end engaging the tube closed end.

6. A caster socket including a transverse top portion centrally apertured and depending wings, a closed end tubular construction slidably mounted in said aperture and terminating in an outwardly directed flange within the depending wings, concentric spring means operatively interposed between said flange and transverse top portion and compressible under load, a load supporting plate connected to the wings, and a pintle rotatably supported by the plate and having its upper end engaging the closed end of said tubular construction and slidable relative to the plate.

7. A shock absorbing caster including in combination a pintle having a top bearing end, an elongated closed end tube bearing thereon and having a lateral flange adjacent the open end, a U-shaped spring frame, a load sustaining plate rotatably and slidably mounted on the pintle, said frame being secured to the plate at one end and slidably supporting said tube at the opposite end, substantially concentric resilient means interposed between the flange and the last mentioned frame end for the purpose set forth, and a detachable connection between the tube and pintle.

8. A shock absorbing caster including in combination a pintle having a top bearing end, an elongated closed end tube bearing thereon and having a lateral flange adjacent the open end, a U-shaped spring frame, a load sustaining plate rotatably and slidably mounted on the pintle, said frame being secured to the plate at one end and slidably supporting said tube at the opposite end, substantially concentric resilient means interposed between the flange and the last mentioned frame end for the purpose set forth, opposite side portions of the frame being normally constrained outwardly for side wall frictional engagement to retain the frame in a tubular leg, and a detachable connection between the tube and pintle, said tube and frame opposite end having a non-rotative connection.

9. A shock absorbing caster including in combination a pintle having a top bearing end, an elongated closed end tube bearing thereon and having a lateral flange adjacent the open end, a U-shaped spring frame, a load sustaining plate rotatably and slidably mounted on the pintle, said frame being secured to the plate at one end and slidably supporting said tube at the opposite end, and substantially concentric resilient means interposed between the flange and the last mentioned frame end for the purpose set forth, opposite side portions of the frame being normally constrained outwardly for side wall frictional engagement to retain the frame in a tubular leg, said tube and frame opposite end having a non-rotative connection.

In witness whereof, we have hereunto affixed our signatures.

WILLIAM B. RAMSEY.
WILLIAM H. NOELTING.